US008413631B2

(12) United States Patent
Herzog et al.

(10) Patent No.: US 8,413,631 B2
(45) Date of Patent: Apr. 9, 2013

(54) BALANCING SHAFT

(75) Inventors: Ewald Herzog, Mahlstetten (DE);
Raphael Herzog, Mahlstetten (DE)

(73) Assignee: Herzog Intertec GmbH, Mahlstetten (DE)

( * ) Notice: Subject to any disclaimer, the term of this patent is extended or adjusted under 35 U.S.C. 154(b) by 0 days.

(21) Appl. No.: 12/452,069

(22) PCT Filed: May 29, 2008

(86) PCT No.: PCT/EP2008/004283
§ 371 (c)(1),
(2), (4) Date: Mar. 24, 2010

(87) PCT Pub. No.: WO2008/151723
PCT Pub. Date: Dec. 18, 2008

(65) Prior Publication Data
US 2010/0192894 A1  Aug. 5, 2010

(30) Foreign Application Priority Data
Jun. 14, 2007  (DE) .................. 10 2007 027 990

(51) Int. Cl.
*F02B 75/06* (2006.01)
*F16C 3/04* (2006.01)
*G05G 3/00* (2006.01)

(52) U.S. Cl.
USPC .......... 123/192.2; 123/90.21; 74/603; 74/591

(58) Field of Classification Search ............... 123/192.2, 123/90.21; 74/603, 591
See application file for complete search history.

(56) References Cited

U.S. PATENT DOCUMENTS 1,749,807 A * 3/1930 Ford .............................. 74/603
2,838,957 A   6/1958 Johnson
(Continued)

FOREIGN PATENT DOCUMENTS

DE  198 35 145 A1  2/2000
DE  101 15 536 A1  10/2001
(Continued)

OTHER PUBLICATIONS

An English translation of the relevant portion of an Office Action dated Jul. 24, 2012, in Japanese Patent Application No. 2010-511517.
(Continued)

*Primary Examiner* — Rinaldi Rada
*Assistant Examiner* — Tea Holbrook
(74) *Attorney, Agent, or Firm* — Kriegsman & Kriegsman

(57) ABSTRACT

The invention relates to a balancing shaft for a multi-cylinder engine having at least one unbalanced weight portion (21, 22; 23, 24) and at least one bearing (16, 17), the at least one unbalanced weight portion (21, 22; 23, 24) being associated with the bearing (16, 17) and the bearing (16, 17) has a radial running face (18) which extends only partially over a periphery of the bearing (16, 17) and a centrifugal force which results during rotation of the balancing shaft (11) is situated within a region of the bearing (16, 17) that is formed by the running face (18) which extends partially over the periphery of the bearing (16, 17), wherein a running ring segment (51) is associated with the partially formed running face (18), said running ring segment adjoining the partially formed running face (18) of the bearing (16, 17) and forming, together with said partially formed running face (18), a completely closed running face (20) of the bearing (16, 17) and having at least one lateral edge (54) which delimits the width of the running ring segment (51) and which spans the partially formed running face (18) and is provided in an unsupported manner.

22 Claims, 5 Drawing Sheets

U.S. PATENT DOCUMENTS

| | | | |
|---|---|---|---|
| 3,673,651 A * | 7/1972 | Stewart | 29/888.08 |
| 3,748,925 A * | 7/1973 | Stewart | 74/603 |
| 4,028,963 A * | 6/1977 | Nakamura et al. | 74/604 |
| 4,617,885 A * | 10/1986 | Oshiro et al. | 123/192.2 |
| 5,293,684 A * | 3/1994 | Fry | 29/888.08 |
| 5,791,309 A * | 8/1998 | Yamazaki et al. | 123/192.2 |
| 6,405,702 B2 * | 6/2002 | Takano et al. | 123/192.2 |
| 6,626,063 B2 * | 9/2003 | Killion | 74/603 |
| 6,659,060 B2 * | 12/2003 | Linder et al. | 123/192.2 |
| 6,708,663 B1 * | 3/2004 | Stuckler | 123/192.2 |
| 6,854,358 B1 * | 2/2005 | Stuckler | 74/603 |
| 6,971,361 B2 * | 12/2005 | Lawrence | 123/192.2 |
| 7,444,976 B2 * | 11/2008 | Hofheinz et al. | 123/192.2 |
| 7,506,628 B2 * | 3/2009 | Marzy et al. | 123/192.2 |
| 7,617,810 B1 * | 11/2009 | Phillips et al. | 123/192.2 |
| 7,628,133 B2 | 12/2009 | Tisch et al. | |
| 2002/0017263 A1 * | 2/2002 | Linder et al. | 123/192.2 |
| 2004/0079316 A1 * | 4/2004 | Lawrence | 123/192.2 |
| 2005/0284254 A1 * | 12/2005 | Hawkins et al. | 74/603 |

FOREIGN PATENT DOCUMENTS

| | | |
|---|---|---|
| DE | 102 57 562 A1 | 7/2004 |
| DE | 103 47 348 A1 | 5/2005 |
| EP | 0 753 678 A2 | 1/1997 |
| EP | 0 789 166 A1 | 8/1997 |
| EP | 1 081 410 A1 | 3/2001 |
| EP | 1 775 484 A2 | 4/2007 |
| EP | 2 014 935 A1 | 1/2009 |
| EP | 2 017 486 A1 | 1/2009 |
| FR | 2 823 279 A1 | 10/2002 |
| JP | 54139936 U | 9/1979 |
| JP | 56056947 A | 5/1981 |
| JP | 58039830 A | 3/1983 |
| JP | 07217638 A | 8/1995 |
| JP | 09151993 A | 6/1997 |
| JP | 2001074105 A | 3/2001 |
| JP | 2001140985 A | 5/2001 |
| JP | 2003035349 A | 2/2003 |
| JP | 2005016644 A | 1/2005 |
| JP | 2006002852 A | 1/2006 |
| JP | 2009210134 A | 9/2009 |
| WO | 2005093286 A1 | 10/2005 |
| WO | WO2005093286 * | 10/2005 |

OTHER PUBLICATIONS

An English translation of the relevant portion of an Office Action dated Oct. 2, 2012, in Japanese Patent Application No. 2010-511516.
ATZ Online website, www.atzonline.de, dated Jan. 13, 2004.
FEV-Spectrum Technologie Highlights aus dem FEV Arbeitsspektrum, Ausgabe 23, Apr. 2003.
Reibleistungsreduktion aus MTZ 7-8/2005 (Reduction of Friction Power disclosed in MTZ 7-8/2005).

* cited by examiner

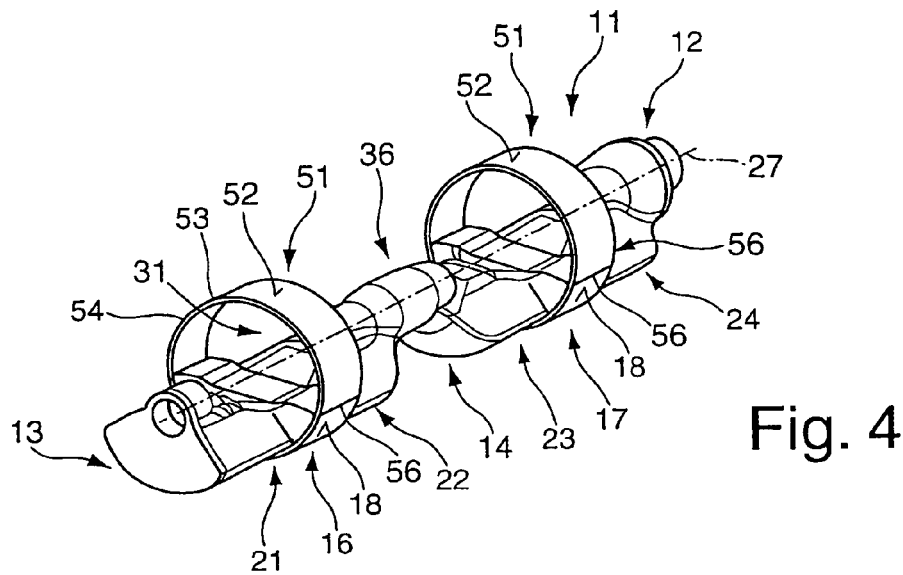
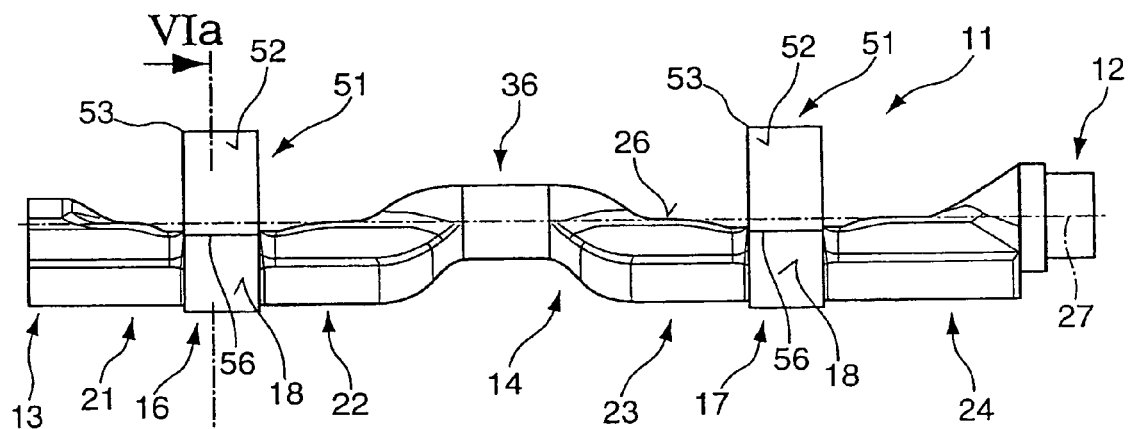
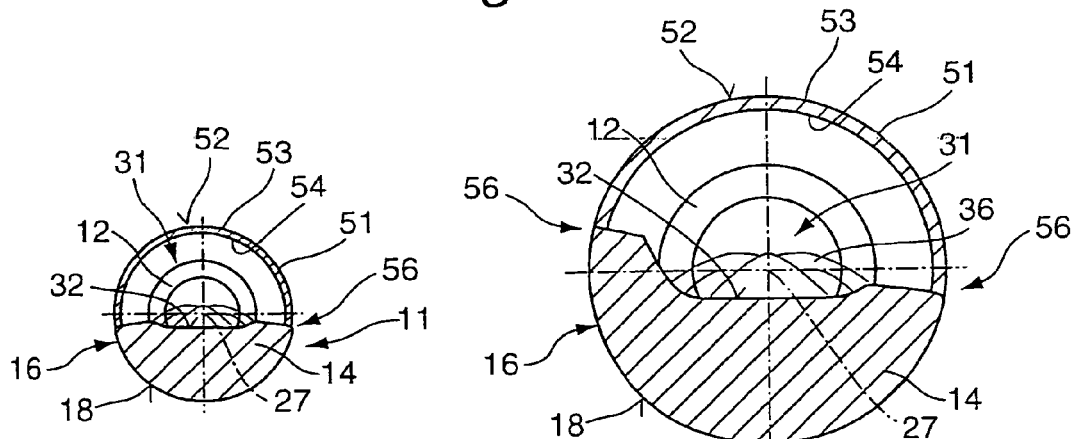

BALANCING SHAFT

The invention relates to a balancing shaft for a single-cylinder or multi-cylinder engine as claimed in the pre-characterizing clause of claim 1.

Balancing shafts for a multi-cylinder engine held within the engine housing by a fixed bearing and a movable bearing have been known from EP 0 789 166 A1. The balancing shafts have each a pinion for rotatably driving these drive shafts. According to a first embodiment, the pinion of the balancing shaft is fixed to a tube into which an asymmetrically formed balancing member is inserted. Subsequently, the frontal ends of the tube are each crimped to the asymmetric balancing member, such that the balancing shaft consists of a generally closed tube within which a semicylindrical balancing member is arranged as an unbalanced weight. According to an alternative embodiment, provision is made for the tube to be substituted by a semicylindrical cover covering a semicylindrical balancing member in its entirety.

Although balancing shafts of this type have the advantage of being simple in terms of design and of allowing easy mounting, these balancing shafts are no longer in keeping with modern demand because of their weight. The requirements for weight reduction and thus for reduced fuel consumption being more and more in the foreground of discussions, massive constructions of this type are no longer desirable.

WO 2005/093286 A1 discloses a balancing shaft for a multi-cylinder engine comprising at least two unbalanced weight portions and at least one bearing, the unbalanced weight portions being arranged symmetrically to the bearing and at least one of the unbalanced weight portions having an end which is remote from the bearing as an end which can be driven for the balancing shaft. A resiliently flexible coupling element is provided between the two bearings with their unbalanced weight portions arranged symmetrically thereto in order to join the two portions together. The unbalanced weight portions are roughly semicircular in their configuration. The bearings are provided as circular cylindrical disks, one half of the cylindrically configured bearing protruding freely relative to the unbalanced weight portions. T-shaped struts, which extend in the longitudinal direction of the balancing shaft and from an axis of rotation, acting on the unbalance, up to a free outer edge region of the cylindrical bearing, are provided to reinforce this balancing shaft. This is intended to reinforce the balancing shaft in the longitudinal direction. Some such balancing shafts are weight-optimized in their configuration; however, owing to the ever higher rotational speeds in multi-cylinder engines, there is a need further to reduce the moved masses. Furthermore, the saving of weight in the development of the engine is of fundamental importance in order to achieve improved performance values.

The invention is therefore based on the object of providing a balancing shaft in which the overall weight and the moved masses are reduced while the compensation for unbalance in single-cylinder or multi-cylinder engines is preserved.

According to the invention, this object is achieved by the features of claim 1. Further advantageous configurations and developments are disclosed in the further dependent claims.

The balancing shaft according to the invention has the advantage that due to the running face being partially formed around a periphery of the bearing, it is possible to achieve a substantial reduction in weight at the bearing. The bearing is thus cut free in partial regions. Thus, one or more unbalanced weight portions provided adjacent to the bearing may also be reduced, which allows an overall reduction in weight of the balancing shaft. Owing to the arrangement according to the invention of a running ring segment which completes, or spans the partial running face by the supporting surface of the running ring segment, it is possible for weight-reduced balancing shafts of this type to be utilized both in conventional engine housings, in which lubrication of the bearing occurs via the engine housing, and with newly developed engine housings, which are preferably configured with a rolling bearing.

Furthermore, the configuration according to the invention has the advantage that with a mounting of this type a long service life may be achieved. Independently of the position of the partially formed running face, extending over a periphery of the bearing, a simple approach of the balancing shaft is enabled. Moreover, despite the fact that the lateral edges of the supporting surface facing toward the partially formed running face are unsupported, a balancing shaft with a high smoothness of running is achieved. The configuration according to the invention therefore allows a universal utilisation and considerable savings in weight, ranging between 20% and 40% as compared with a conventional balancing shaft.

According to an advantageous configuration of the invention, provision is made for the running ring segment and the partially formed running face of the bearing to be joined together by a positive and/or a non-positive connection. This may allow a simple mounting of the running ring segment with respect to the running face. The positive connection may allow a precise alignment of the running ring segment with respect to the running face, thus ensuring greater ease of mounting.

According to a further advantageous configuration of the invention, provision is made for the running ring segment to be connected with the partially formed running face by a material-uniting connection. This may be done using welding methods or pressure welding methods ensuring a permanent connection between the running ring segment and the balancing shaft. This allows balancing shafts of this type having cut-free running ring segments to equally be produced in a cost-effective and precise manner. As an alternative, methods such as induction welding soldering, or the like may be provided.

According to an advantageous configuration of the invention, provision is made for the running face of the bearing to have a peripheral angle of more than 180° and advantageously to extend continuously within this peripheral angle.

According to an alternative configuration of the invention, provision is made for the partially formed running face of the bearing to have a peripheral angle of equal to, or less than 180° and advantageously to extend continuously within this peripheral angle. By reducing the peripheral angle in this manner, it is possible to achieve a further reduction in weight of the adjoining unbalanced weight portions and, consequently, of the overall weight.

According to a preferred configuration of the invention, the running ring segment has a supporting surface with a constant width. This makes it possible to create simple geometrical relationships. The width of the supporting surface preferably corresponds to the width of the running face, such that a uniform and continuous overall surface is created at the bearing or at the bearings.

According to a further advantageous configuration of the invention, provision is made for the supporting surface of the running ring segment to be formed so as to taper in width on one or on both sides, preferably having its narrowest cross-section in the vertex of the running ring segment. A reduction in cross-section of this type may contribute to further reduce the total mass. Moreover, it is possible to reduce bearing friction. Advantageously, the partially formed running face and the running ring segment are designed to be of identical width in the transition region therebetween, so that a seamless transition may be achieved.

According to a further preferred configuration of the invention, provision is made for a contact surface to be provided in the connection zone between the running ring segment and the running face, said contact surface being offset toward the axis of rotation with respect to the running face. This allows a defined accommodation and positioning of the running ring segment relative to the balancing shaft. A pre-fixation by a non-positive and/or a positive connection may be provided. This may facilitate the mounting and the subsequent fixation of the running ring segment with respect to the balancing shaft.

The connection zone at the respective bearing preferably has locating members extending in a peripheral direction which align the running ring segment axially relative to the running face. A precise positioning of the running ring segment relative to the bearing may thus be ensured. In addition, this pre-fixation serves for facilitating the fastening of the running ring segment to the balancing shaft, in particular by means of a material-uniting connection.

According to a further advantageous configuration of the invention, provision is made for the running face and the supporting surface of the running ring segment to be spherical in their configuration, viewed in the axial direction. This allows bending stresses occurring during operation between the bearings and tilting or toppling to be accommodated without damage to the bearing, such as for example a bearing bush, a bearing ring, needle rollers or cylindrical rollers.

The bearing of the balancing shaft comprises, viewed in cross section to the longitudinal direction thereof, a depression which is for example configured in a V-shaped, W-shaped, tub-shaped or cup-shaped manner.

Depressions of this type can be formed immediately during the manufacture of the balancing shaft by casting, forging, pressing or the like and also by machining, thus allowing economical manufacture of bearings of this type while at the same time saving weight.

Preferably, provision is made for the depression in the bearing to be configured symmetrically to the longitudinal direction of the balancing shaft. This allows the balancing shaft to be developed in a simple manner in terms of design and in particular the configuration of the unbalanced weight portions.

According to an alternative configuration of the depression, provision is made for said depression to form, together with the running face of the bearing extending only partly over the periphery, a cross-sectional surface in which the axis of rotation lies in the cross section of the bearing. This embodiment has the advantage of allowing the balancing shaft to be reinforced and the balancing shaft thus to be used for particular loads. In such a case, the somewhat reduced saving in weight is of secondary importance.

According to an alternative configuration of the invention, provision is made for the depression in the bearing to have, viewed in cross section, at least one central portion situated in the axis of rotation of the balancing shaft. This allows the axis of rotation to be reinforced, wherein at least one further depression portion can be configured adjacent to the central portion in order to save weight.

A further alternative configuration of the bearing provides for the running face of the bearing and the depression adjoining it to form a cross-sectional surface in which the axis of rotation lies outside the cross-sectional surface. A crescent-shaped cross section of the bearing can for example be achieved in this way. A cross section of this type has the advantage that said cross section at the same time acts and can be used as a scoop for the lubricating liquid.

A further alternative embodiment of the bearing provides for a depression to form with the running face extending partially over the periphery of the bearing a turbine wheel-like cross section. This greatly favors the conveyance of the lubricating liquid.

A further advantageous configuration of the bearing for the balancing shaft provides for the running faces extending partially over the periphery to be configured symmetrically to the resulting centrifugal force on rotation of the balancing shaft. As a result, the bearings themselves act as unbalanced weight portions and can be included in the calculation thereof for the design of the balancing shaft.

Furthermore, provision is advantageously made for the running-face width of the running face, extending partially over the periphery, of the bearing to taper, at least in certain portions, to the end portions of the running face. In other words, this means that the running face has in the region of action of the resulting centrifugal force a greatest width or extent in the longitudinal direction of the axis of the balancing shaft and tapers, at least in certain portions, in and counter to the clockwise direction to the free end portions of the running face in the width thereof. An additional saving in weight and reduction in bearing friction can be achieved as a result. The width of the running face can also change a plurality of times along the peripheral angle, thus providing tapering and widening in alternation. The tapered width of the running face may serve as a connection width for the running ring segment, such that the tapered running face width is adopted and continued as the width of the supporting surface for the running ring segment.

The peripheral angle of the running faces of the first bearing is, according to an advantageous configuration of the invention, equal to the peripheral angle of the running face of the at least one further bearing. This provides the same bearing conditions at each bearing. The same is true, by analogy, of the supporting surface of the partial running ring segment.

Furthermore, provision is preferably made for the first and at least one further running face of the at least one further bearing to be of the same orientation, viewed in the longitudinal direction of the axis of the balancing shaft, with respect to the peripheral angle thereof. A balancing shaft for the static unbalance in the engine housing can in particular be provided in this way. At the same time, this also allows a substantially mirror-symmetrical arrangement relative to the center plane of the balancing shaft. These remarks are equally applicable to the running ring segment.

According to an alternative configuration of the invention, provision is made for the running faces of the bearings to be provided rotated relative to one another in the longitudinal direction of the axis. This allows what is known as an unbalance of moments to be compensated for. Balancing shafts of this type are used in particular in engines having a V-shaped cylinder arrangement or an odd number of cylinders. For example, in a balancing shaft having two bearings, the running faces of these bearings can be provided rotated through 180° relative to one another. If more than two bearings are provided, the orientation of the running surfaces is adapted to the unbalance of moments to be achieved and arranged offset or rotated relative to one another in the radial direction of action, in accordance with the center plane of the balancing shaft, so that the corresponding unbalances of moments can be generated.

Preferably, for a balancing shaft, provision is made, for the unbalance of moments, for said balancing shaft to be configured substantially point-symmetrically to the center plane.

This allows defined forces to act, in accordance with the respective lever arm, relative to the center plane, thus allowing the unbalance of moments to be adapted precisely to the forces to be counteracted.

According to a further preferred configuration, provision is made, in the case of at least two running faces, arranged relative to one another mutually rotated about the X axis or longitudinal axis of the balancing shaft, of the bearing, for an overlap region of the running faces to be provided. The end regions of the running face are preferably slightly superimposed on one another, viewed in a direction along the longitudinal axis. This allows low-loss mounting to be provided. As an alternative to this embodiment, provision may be made for an overlap region to be provided between the running ring segment of the one bearing and the partially formed running face of the further bearing.

According to a further preferred configuration of the invention, provision is made for at least one unbalanced weight portion to have an outer peripheral portion having a larger diameter than that of the at least one running face of the bearing. Such unbalanced portions protruding beyond the outer periphery of the running face are provided preferably on an outer end portion of the balancing shaft, so that simple mounting is preserved. Balancing shafts of this type also serve to compensate for the unbalance of moments.

The invention and further advantageous embodiments and developments thereof will be described and explained in greater detail hereinafter based on the examples illustrated in the drawing. According to the invention, the features which may be inferred from the description and the drawings can be applied each individually or jointly in any desired combination. In the drawings:

FIG. 4 is a perspective view of a second embodiment according to the invention of a balancing shaft;

FIG. 5 is a schematic side view of the balancing shaft according to FIG. 4;

FIG. 6a is a schematic sectional view taken along the line V-V in FIG. 5, FIG. 6b is a schematic sectional view of an alternative embodiment, differing from FIG. 5;

Figure 1:
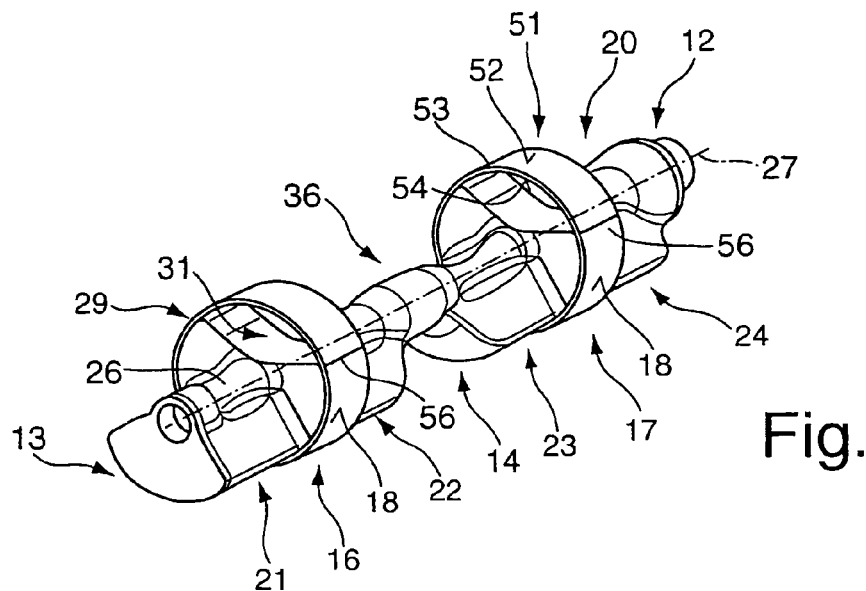
FIG. 1 is a perspective view of a first embodiment according to the invention of a balancing shaft.

FIG. 1 is a perspective view of a first embodiment of the balancing shaft 11 according to the invention. A balancing shaft 11 of this type is provided for a multi-cylinder engine and serves to compensate for second-order mass forces. Conventionally, two balancing shafts, which then rotate in opposite directions at double engine speed, are arranged offset relative to each other.

A drive (not shown in greater detail), such as for example a chain wheel which drives the balancing shaft 11, is provided at a trailing end portion 12, shown in FIG. 1, of the balancing shaft. The balancing shaft 11 comprises a basic element 14 on which the first and second bearing 16, 17 are provided. Said bearings serve to mount the balancing shaft 11 in an engine unit. These bearings 16, 17 have a running face 18, the periphery of which is configured so as to be larger than a periphery of the remaining portions of the basic element 14. This allows the balancing shaft 11 to be inserted into the bearings or bearing bushes in the engine unit, with one end portion 13 in front.

In symmetrical disposition with respect to the first and second bearings 16, 17, unbalanced weight portions 21 to 24 are arranged, the unbalanced weight portions 22 and 23 merging with each other seamlessly. The end portions 12 and 13 are taken into account in the dimensioning of said unbalanced weight portions. The basic element 14 has wall portions 26 which are offset with respect to an axis of rotation 27 of the balancing shaft 11 in such a manner that the axis of rotation 27 lies within a cross-sectional surface of the bearing 16, 17 (FIG. 3).

The first and second bearings 16, 17 each have a running face 18 extending partially over the periphery of a bearing 16, 17, said running face 18 encompassing a peripheral angle of between 180° and 359°. This configuration basically forms what is known as a partial bearing. This partial bearing is completed about its periphery by a running ring segment 51 which comprises a supporting surface 52. The supporting surface 52 and the running face 18 together form a total running face 20 which encompasses a peripheral angle of 360°. The running face 18 and the supporting surface 52 preferably seamlessly merge with one another in the peripheral direction.

Preferably, the running ring segment 51 is adapted in its width to the running face 18. The radially outer lateral edge 53 of the running ring segment 51 preferably merges flush with the running face 18. The radially inner lateral edge 54 of the running ring segment 51 is supported by a wall portion 32 of the partial bearing. The running ring segment 51 has a thin wall thickness, such that the running ring segment 51 spans the partial bearing in an arcuate manner and completes it about its periphery. Preferably, the wall thickness of the running ring segment 51 is chosen to be thin, so as to achieve a maximum reduction in weight while still offering sufficient inherent rigidity. In the case of an edge region in the form of a circular arc, the lateral edges 53 and 54 may coincide, forming at their outermost point a radially inner lateral edge 54. The lateral edge 54 preferably takes a rectilinear course. Alternatively, the lateral edge may also be realised in a corrugated manner or the like. The radially inner lateral edge 54 of the running ring segment 51 is formed in a self-supporting manner, which is to say that this, lateral edge 54 is not supported on any other body portion of the balancing shaft 11, with the exception of the connection zone 56 leading to the running face 18.

Figure 2:
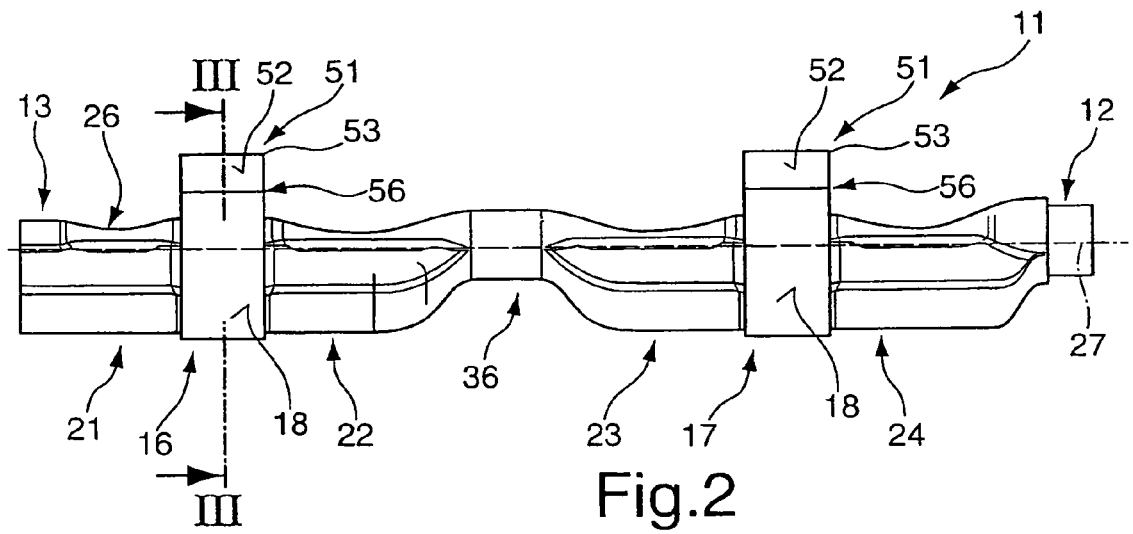
FIG. 2 is a schematic side view of the balancing shaft according to FIG. 1.
Figure 3:
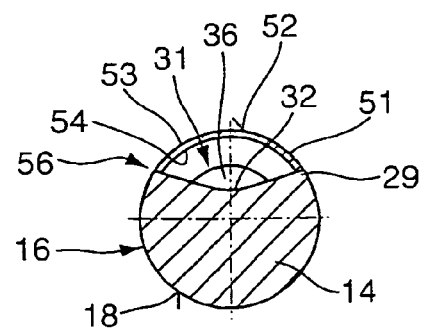
FIG. 3 is a schematic sectional view along the line III-III in FIG. 2.

In the exemplary embodiment according to FIGS. 1 to 3, the width of the supporting surface 52 is formed to be constant over the peripheral angle of the running ring segment 51. The connection zone 56 between the running face 18 and the running ring segment 51 is realised as a kind of obtuse butt joint. Preferably, the running ring segment 51 is fixed with respect to the partially formed running face by means of a welded joint, in particular a pressure-welded joint, and subjected to precision-grinding subsequent to the welding process, if necessary.

In the exemplary embodiment according to FIG. 3, the peripheral angle of the running face 18 lies for example in a range of between 190° and 220°. The other, remaining region is completed by the running ring segment 51. The first and second bearings 16, 17 according to the invention illustrated in FIGS. 1 to 3 allow a bearing 16, 17 to be configured with a considerable saving in weight as compared to circular cylindrical or disk-like bearings known in the art. At the same time, it can be ensured by way of the end regions 29 protruding therebeyond over an angle of wrap of 180° that a simple approach of a stationary balancing shaft 11 in a bearing in the engine unit is enabled and that, in particular if the balancing shaft stops in a position in which the unbalanced weight portions 21 to 24 point vertically upward, a secure approach is facilitated without tilting.

The bearing 16, 17 has, viewed in the cross section according to FIG. 3, a depression 31 which is V-shaped, cup-shaped, or tub-shaped in its configuration. The geometry may be adapted to the required rigidity, to the degree of unbalance, and to the connection point for the running ring segment 51. A central wall portion 32 of the depression 31 is situated above the axis of rotation 27. Flattenings, which gradually merge with an arc of a circle and delimit the unbalanced weight portion 21, 22, 23 and 24, are provided adjoining the central wall portion 32.

Alternatively, provision may be made for a central wall portion 32 to lie in the axis of rotation 27 of the basic element 14. The running face 18 may in this case have a peripheral angle of either 180°, more than 180°, or less than 180°. This variation in the angle of wrap may also be provided in the embodiment represented in FIG. 3 with regard to the arrangement of the wall portion 32 relative to the axis of rotation 27.

The bearings 16, 17 according to the embodiment in FIG. 1 are connected to each other by means of what is known as a rest action portion 36. For the purpose of reducing unbalanced weight, seamless transitions are provided from the unbalanced weight portions 22 and 23 to a rest action portion 36 which provides support during the manufacture of balancing shafts 11 of this type, since for machining purposes the balancing shaft 11 is mounted between tips.

In the balancing shaft 11 represented in FIGS. 1 to 3, the bearings 16, 17 are realized so as to form a sliding bearing, with lubrication occurring in particular via the housing. These bearings 16, 17 may also be realized to form a rolling bearing within the engine unit. The bearings on the engine unit may for example comprise cylindrical rollers or rollers having a needle bush.

The balancing shaft illustrated in FIGS. 1 to 3 compensates in particular for mass forces which generate a static unbalance, such as occur for example in four-cylinder in-line engines. This can compensate for a static unbalance acting for example in a Y axis lying perpendicular to the Z axis, the X axis forming the longitudinal axis of the balancing shaft 11.

FIGS. 4 to 6 illustrate a further alternative embodiment of a balancing shaft 11 to FIG. 1. In this balancing shaft 11, the basic element 14 is modified and, as illustrated in FIG. 6, the bearing 16, 17 configured differently from FIG. 3.

The bearing 16, 17 comprises a depression 31 which is for example tub-like in its configuration, a central wall portion 32 forming, together with the depression 31 and the running face 18 extending partially over the periphery of the bearing 16, 17, a cross-sectional surface lying outside the axis of rotation 27. In an embodiment of this type, the weight of the bearing 16, 17 is reduced still further relative to the embodiment in FIG. 3. The reduction associated therewith is compensated for as a result of the fact that by comparison less mass, which is at a greater distance from the axis of rotation, is provided at one or more points. This principle allows further reduction of the total mass. Provision is in this case preferably made for seamless transitions to be provided from the end portions 12, 13 in each case to the central wall portion 32 of the bearing 16, 17. Such seamless transitions are also provided to the center of the balancing shaft 11 which comprises a rest action portion 36. During the manufacture of a balancing shaft 11 of this type, which is rotatably mounted between tips on the end portions 12 and 13, a holding device or rest additionally acts on the rest action portion 36 in order to allow precise configuration of the running face 18 during machining of the balancing shaft.

A balancing shaft 11 illustrated in FIGS. 4 to 6a is designed for a maximum lightweight construction. Depending on the materials used, a minimum degree of rigidity and bending strength can be achieved in the longitudinal direction of the balancing shaft 11. The unbalanced weight portions 21, 22 and also 23 and 24 are arranged symmetrically to the bearing 16, 17, wherein in each case their further course of the basic element 14, such as for example that of the end portions 12, 13 and that of the rest action portion 36, influences the design of the mass of the unbalanced weight portions 21, 22, 23, 24. The segment of a circle-shaped cross section of the unbalanced weight portions 21, 22, 23, 24 has the advantage of allowing the unbalanced weight to be positioned eccentrically well outside the axis of rotation 27.

FIG. 6b represents an alternative embodiment, differing from FIG. 6a. Provision may be made in this case for the running face 18 to be formed asymmetrically relative to the remaining structure of the balancing shaft, and, adapted thereto, the supporting surface 52 of the running ring segment 51 to be equally shaped in an asymmetric manner. This allows the resultant force of the centrifugal force to be oriented in a predetermined direction.

Figure 7:
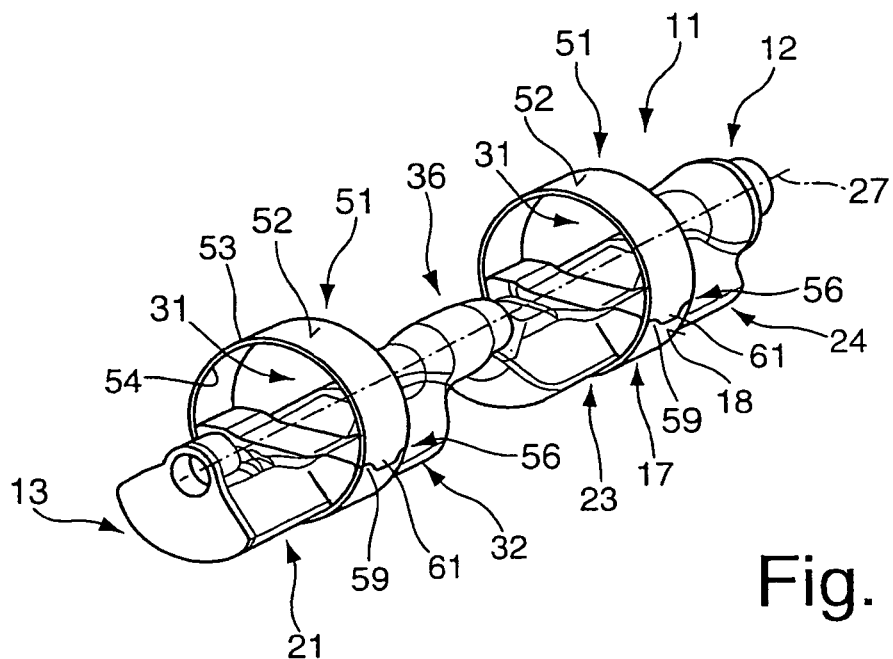
FIG. 7 is a perspective view of a third embodiment according to the invention of a balancing shaft.
Figure 8:
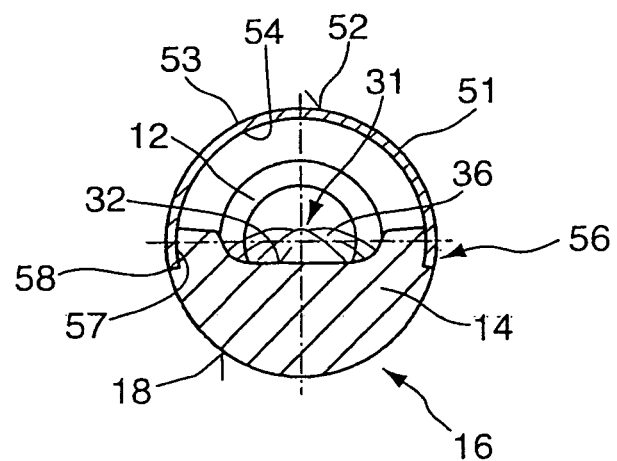
FIG. 8 is a schematic sectional view taken along the line VII-VII in FIG. 7.

A further alternative embodiment of the invention is provided in FIGS. 7 and 8. The connection zone 56 is in this case formed in such a manner that an end face 58 of the running ring segment 51 abuts flush with a step formed by the contact surface 57 that is offset backward with respect to the running surface 18, thus enabling a seamless transition between the running face 18 and the supporting surface 51. At the same time, the running ring segment 51 is reinforced in this transition zone by the partial running face 18, so that a resistant assembly is achieved. Moreover, for an assembly of this type, an easier fixation of the running ring segment 52 with respect to the partially formed running face 18 is preferably enabled.

In the connection zone 56, locating members 59 are further provided, forming an intermediary depression with which a tab 61 of the running ring segment 51 engages. This allows a positionally correct pre-fixation of the running ring segment 51 in an axial direction with respect to the running face 18. At the same time, a positionally correct arrangement in the peripheral direction is favored. Furthermore, provision may be made for a depression to be provided in the radial direction relative to the axis of rotation, said depression being engaged by a projection formed on an interior side of the running ring segment 51 and pointing radially toward the axis of rotation. The embodiments for locating the running ring segment 51 in an axial, radial, and peripheral direction may be provided individually or may be combined with each other in any desired manner.

Figure 9:
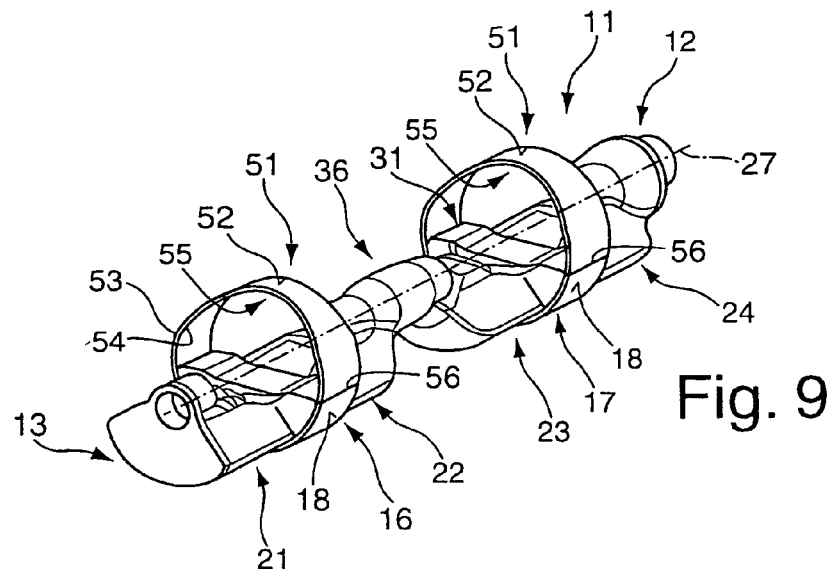
FIG. 9 is a perspective view of a forth embodiment according to the invention of a balancing shaft.
Figure 10:
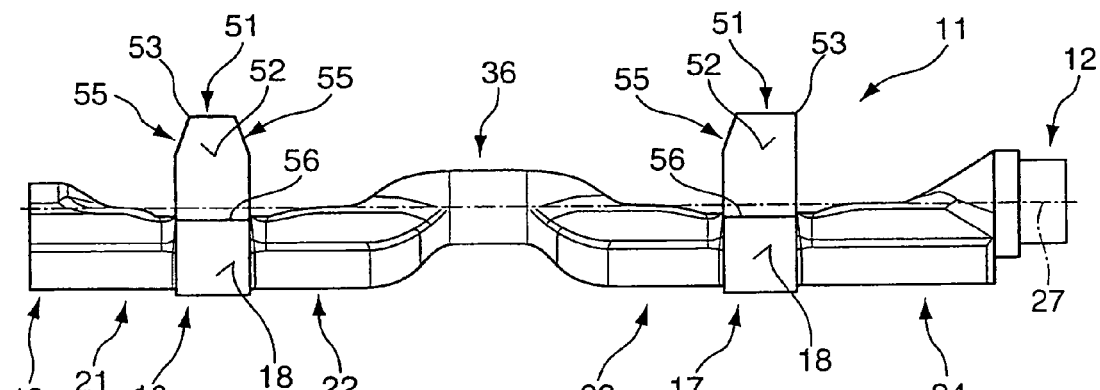
FIG. 10 is a schematic side view of the balancing shaft according to FIG. 9.
Figure 11:
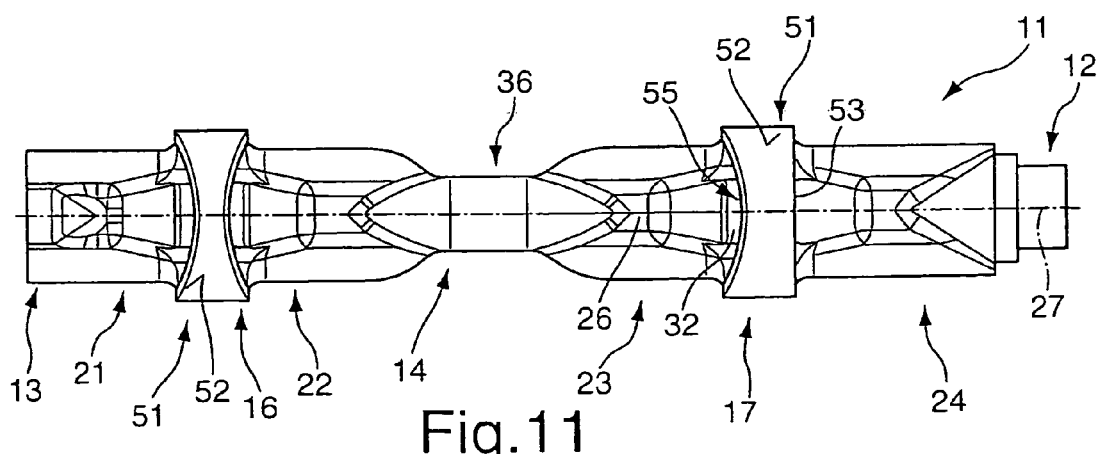
FIG. 11 is a further schematic side view of the balancing shaft according to FIG. 9.

FIGS. 9 to 11 represent a further alternative embodiment of the balancing shaft 11. In this balancing shaft 11, which comprises for example two bearings 16, 17, the running ring segments 51 are formed different from each other in their geometry. For example, the running ring segment 51 of the bearing 17 is provided with a taper 55 in cross-section only at one side thereof. The running ring segment 51 of the bearing 16, on the other hand, is provided with a taper 55 in the width of the running ring segment 51 formed on both sides and pointing in particular toward the vertex thereof. Such tapers 55 may be provided, for example, by seamless transitions in the form of circular segment or arcuate segments. By such tapers 55, both a reduction in friction and a reduction in weight are achieved.

In an alternative embodiment, not shown in greater detail, the depression is formed with a turbine wheel-like cross-section or an asymmetric cross-section.

The configuration of the depression or the cutting-free of the partially formed bearing may be adapted in their shape, size and/or geometry to the respective application, wherein a large number of possible configurations can be provided.

Figure 12:
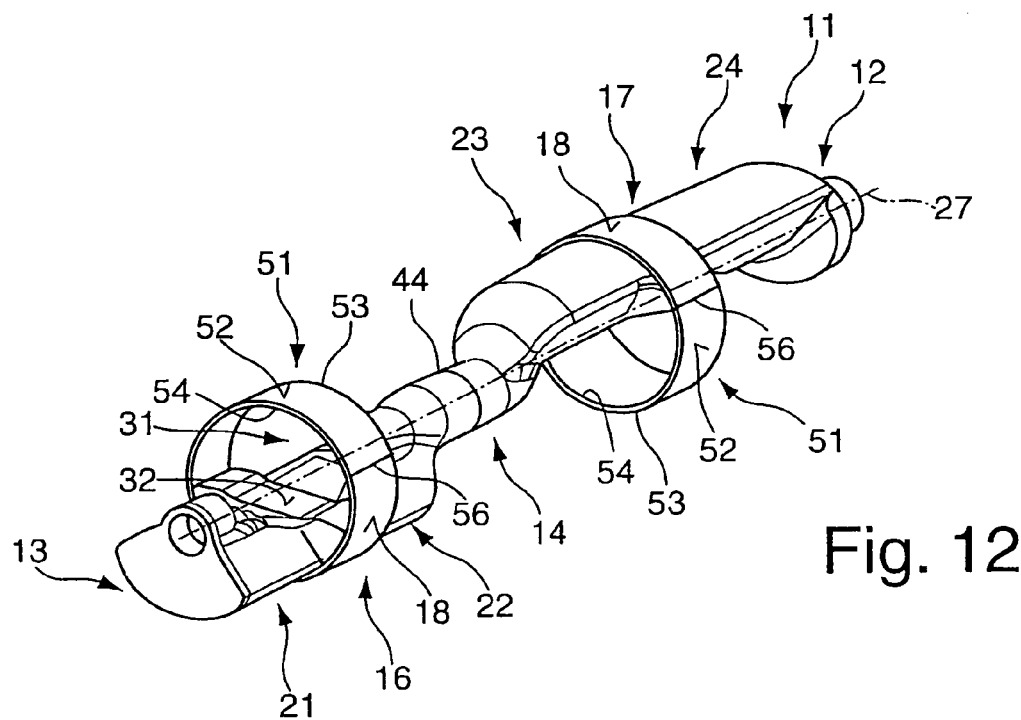
FIG. 12 is a perspective view of a fifth embodiment according to the invention of a balancing shaft.
Figure 13:
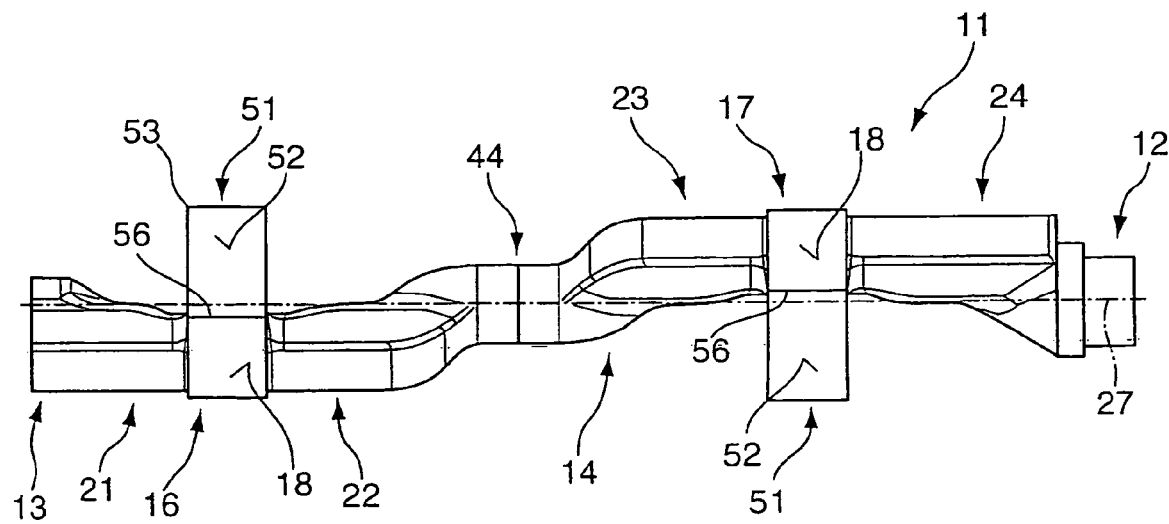
FIG. 13 is a schematic side view of the balancing shaft according to FIG. 12.

FIGS. 12 and 13 represent a further alternative embodiment of a balancing shaft 11. This balancing shaft 11 differs from that of the preceding figures in that the unbalanced weight portions 21, 22, 23, 24 and the bearings 16, 17 are configured substantially point-symmetrically to the center plane 44. The center plane 44 lies perpendicular to the X axis or axis of rotation or longitudinal axis of the balancing shaft 11. A balancing shaft 11 of this type is used, in contrast to the foregoing balancing shafts 11 according to FIGS. 1 to 11, to compensate for unbalances of moments. Such compensating for unbalances of moment is provided in engines having for example a V-shaped cylinder arrangement, such as in V3 or V6 engines or in-line engines having an odd number of cylinders. In this embodiment, the peripheral angle of the running face 18 of each bearing 16, 17 is preferably configured in such a way that, viewed in the axis of rotation of the balancing shaft 11, at least one end region 29 of the running face 18 overlaps. In other respects, that which was stated with regard to the foregoing figures applies.

In a further alternative embodiment, which is not shown in greater detail and which is an alternative to the balancing shaft 11 according to FIGS. 12 and 13, an unbalanced weight portion 46 having at least in certain portions, an outer periphery which is larger in diameter than the diameter of the running face 18, is provided at one end of the balancing shaft 11. This unbalanced weight portion 46 is configured as a disk-like unbalanced mass or as a partial segment of a disk-like unbalanced mass. The arrangement of an unbalanced mass of this type at an outer end of the balancing shaft 11 has the advantage of preserving simple mounting of the balancing shaft 11.

In other respects, that which was stated with regard to the foregoing figures applies. The unbalanced weight portion 46 can be configured in addition to or comprise the unbalanced weight portions 21, 24 lying at the outer end.

The balancing shafts 11 described hereinbefore can also be combined with one another in any desired manner in an engine. This is dependent on the construction of the engine, so that the design of the balancing shaft or the balancing shafts must be adapted to the static unbalance and/or unbalance of moments to be compensated for. Likewise, individual features of individual balancing shafts 11 can be combined with one another.

All the exemplary embodiments described hereinbefore have in common the fact that the center of gravity of the balancing shaft 11 comprises, at the latest in the mounted state, a center of gravity in a center of the multi-cylinder engine based on the longitudinal direction thereof. Furthermore, a common feature shared by all embodiments is the fact that the running ring segment 51 comprises at least one unsupported lateral edge 54 spanning the depression 31 of the partially formed running face 18. Thus, the total running face 20, consisting of the supporting surface 52 and the partially formed running face 18, is independent of an adjoining bearing, while at the same time the reduction in weight is maximized.

All the features described hereinbefore are each per se essential to the invention and can be combined with one another in any desired manner.

The invention claimed is:

1. A balancing shaft for a single-cylinder or multi-cylinder engine having at least one unbalanced weight portion and at least one bearing, the at least one unbalanced weight portion being associated with the bearing and the bearing has a radial running face which extends only partially over a periphery of the bearing and a centrifugal force which results during rotation of the balancing shaft is situated within a region of the bearing that is formed by the running face which extends partially over the periphery of the bearing, wherein a running ring segment is associated with the partially formed running face, said running ring segment adjoining the partially formed running face of the bearing and forming, together with said partially formed running face, a completely closed running face of the bearing and having at least one lateral edge which delimits the width of the running ring segment and which spans the partially formed running face and is provided in an unsupported manner.

2. The balancing shaft as claimed in claim 1, wherein the running ring segment and the partially formed running face of the bearing are joined by a positive and/or a non-positive connection.

3. The balancing shaft as claimed in claim 1, wherein the running ring segment is joined together with the partially formed running face of the bearing by a material-uniting connection, in particular by means of welding or soldering.

4. The balancing shaft as claimed in claim 1, wherein the partially formed running face of the bearing has a peripheral angle of more than 180° and advantageously extends continuously within this peripheral angle.

5. The balancing shaft as claimed in claim 1, wherein the partially formed running face of the bearing has a peripheral angle of equal to, or smaller than 180° and advantageously extends continuously within this peripheral angle.

6. The balancing shaft as claimed in claim 1, wherein the running ring segment has a supporting surface with a constant width and that the width of the supporting surface preferably corresponds to the width of the running face.

7. The balancing shaft as claimed in claim 1, wherein a supporting surface of the running ring segment is formed so as to taper in width on one or on both sides, and preferably has its narrowest cross-section in the vertex of the running ring segment.

8. The balancing shaft as claimed in claim 7, wherein the depression is configured symmetrically to the longitudinal direction of the balancing shaft or the depression forms with the running face (18) of the bearing a turbine wheel-like or an asymmetrical cross section.

9. The balancing shaft as claimed in claim 7, wherein the running face of the bearing and the depression adjoining it form a cross-sectional surface in which the axis of rotation lies within this cross-sectional surface or wherein the depression has at least one central wall portion which is situated in the axis of rotation of the balancing shaft or wherein the running face of the bearing and the depression adjoining it form a cross-sectional surface in which the axis of rotation lies outside this cross-sectional surface.

10. The balancing shaft as claimed in claim 1, wherein the partially configured running face of the bearing extends symmetrically to the resulting centrifugal force during the rotation of the balancing shaft.

11. The running ring segment as claimed in claim 1, wherein a contact surface is provided in the connection zone of the running ring segment leading to the running face, which contact surface is offset backward in the direction of the axis of rotation with respect to the running face.

12. The balancing shaft as claimed in claim 1, wherein at least one locating member extending in the peripheral direction or in the radial direction is provided in the connection zone of the running ring segment leading to the running face, which locating member positions the running ring segment at least axially with respect to the running face.

13. The balancing shaft as claimed in claim 1, wherein the running face and the supporting surface are cylindrical in their configuration.

14. The balancing shaft as claimed in claim 1, wherein the bearing has, viewed in cross section to the longitudinal direction of the balancing shaft, a depression, in particular a V-shaped, W-shaped, tub-shaped or cup-shaped depression, which is spanned by the running ring segment.

15. The balancing shaft as claimed in claim 10, wherein the running faces, which are arranged rotated relative to one another, of the first and at least one further bearing have, viewed in the longitudinal direction of the axis, an overlap region.

16. The balancing shaft as claimed in claim 1, wherein the running-face width of the bearing tapers, at least in certain portions, to end regions of the partially configured running face.

17. The balancing shaft as claimed in claim 1, wherein a peripheral angle of the running face or of the running ring segment of the first bearing is equal to the peripheral angle of the running face or of the running ring segment of at least one further bearing.

18. The balancing shaft as claimed in claim 1, wherein the first and at least one further running face or the first or at least one further running ring segment of the bearings are of the same orientation, viewed in the longitudinal direction of the axis, with respect to the peripheral angle thereof.

19. The balancing shaft as claimed in claimed 18, wherein the unbalanced weight portion is provided at an outer end of a basic element.

20. The balancing shaft as claimed in claim 1, wherein the first and at least one further running face or the at least one further running ring segment of the bearings are arranged, viewed in the longitudinal direction of the axis, rotated relative to one another.

21. The balancing shaft as claimed in claim 1, wherein at least one bearing, the running face thereof and an unbalanced weight portion are arranged point-symmetrically to the center plane of the balancing shaft.

22. The balancing shaft as claimed in claim 1, wherein at least one unbalanced weight portion is provided, which has at least one outer peripheral portion having a larger diameter than that diameter of the at least one running face of the bearing.

* * * * *